US009732255B2

(12) United States Patent
Curet

(10) Patent No.: US 9,732,255 B2
(45) Date of Patent: Aug. 15, 2017

(54) COMPOSITION FOR STRUCTURAL ADHESIVE

(71) Applicant: Jacret, Le Thillay (FR)

(72) Inventor: Arnaud Curet, Senlis (FR)

(73) Assignee: Jacret, Le Thillay (FR)

( * ) Notice: Subject to any disclaimer, the term of this patent is extended or adjusted under 35 U.S.C. 154(b) by 0 days.

(21) Appl. No.: 13/936,675

(22) Filed: Jul. 8, 2013

(65) Prior Publication Data

US 2013/0292054 A1  Nov. 7, 2013

Related U.S. Application Data

(63) Continuation of application No. 12/933,552, filed as application No. PCT/EP2009/053332 on Mar. 20, 2009, now Pat. No. 8,480,844.

(30) Foreign Application Priority Data

Mar. 21, 2008 (FR) ..................... 08 01553

(51) Int. Cl.
*C09J 11/06* (2006.01)
*C09J 9/00* (2006.01)
*C08K 5/14* (2006.01)
*C08K 5/18* (2006.01)
*C08K 5/521* (2006.01)

(52) U.S. Cl.
CPC .............. *C09J 11/06* (2013.01); *C09J 9/00* (2013.01); *C08K 5/14* (2013.01); *C08K 5/18* (2013.01); *C08K 5/521* (2013.01); *C09J 2433/00* (2013.01)

(58) Field of Classification Search
None
See application file for complete search history.

(56) References Cited

U.S. PATENT DOCUMENTS

| 3,985,703 | A | 10/1976 | Ferry et al. |
| 4,223,115 | A | 9/1980 | Zalucha et al. |
| 4,304,709 | A | 12/1981 | Salee |
| 4,403,058 | A | 9/1983 | Dohi et al. |
| 4,775,727 | A | 10/1988 | Taylor |
| 5,106,917 | A | 4/1992 | Lee et al. |
| 6,433,091 | B1 | 8/2002 | Cheng |
| 6,869,497 | B2 | 3/2005 | Doe et al. |
| 8,480,844 | B2 * | 7/2013 | Curet ............................ 156/327 |
| 2003/0181546 | A1 * | 9/2003 | Hettich et al. .................... 524/2 |
| 2005/0238603 | A1 | 10/2005 | Themens et al. |
| 2007/0155899 | A1 | 7/2007 | Briggs et al. |
| 2010/0236716 | A1 | 9/2010 | Hisha et al. |

FOREIGN PATENT DOCUMENTS

| CA | 2279354 A1 | 8/1998 |
| EP | 1256615 A2 | 11/2002 |
| EP | 894119 B1 | 6/2004 |
| JP | 2007-169560 A | 7/2007 |
| WO | WO-87/00536 A1 | 1/1987 |
| WO | WO-97/39074 A1 | 10/1997 |
| WO | WO-98/34980 A1 | 8/1998 |
| WO | WO-03/086327 A2 | 10/2003 |
| WO | WO-2009/041248 A1 | 4/2009 |

OTHER PUBLICATIONS

English language abstract for JP2007-169560A Kurimura, H., et al., Jul. 5, 2007, Database WPI, Accession No. 2007-552421.
English translation of JP2007-169560A, Jul. 5, 2007 (machine translation).
English language Abstract for JP2007-169560A (Kurimura, H., et al.) Jul. 5, 2007.
DuBois, D., et al., "High performance styrenic block copolymers featuring a novel hybrid midblock phase," Adhesives & Sealants Council Meeting, Louisville, KY, Oct. 9-12, 2005.

* cited by examiner

*Primary Examiner* — Jeffrey Mullis
(74) *Attorney, Agent, or Firm* — Polsinelli PC

(57) ABSTRACT

The invention relates to a composition for a structural acrylic adhesive that comprises an adhesion promoter including a phosphate ester and a high molecular-weight polyamine as a polymerization accelerator.

19 Claims, No Drawings

COMPOSITION FOR STRUCTURAL ADHESIVE

RELATED APPLICATIONS

This application is a continuation of U.S. application Ser. No. 12/933,552, filed Dec. 20, 2010, which is a national stage application (under 35 U.S.C. §371) of PCT/EP2009/053332, filed Mar. 20, 2009, which claims benefit of French application Ser. No. 08/01553, filed Mar. 21, 2008, the entire contents of each of which applications are incorporated herein by reference.

FIELD OF THE INVENTION

The present invention relates to the field of acrylic structural adhesives (based on acrylate or on methacrylate) and to the uses thereof.

BACKGROUND OF THE INVENTION

Structural adhesives are a good alternative to other mechanical techniques for binding two materials together, such as metals or plastics. This is because the force distribution is better with bonding than when alternative techniques such as riveting or welding are used. In addition, the use of bonding often makes it possible to work more rapidly, and also has the advantage of providing better insulation against external elements (dust, moisture) than the mechanical technologies.

Structural adhesives are formed from two components: a composition containing the curing agent (based on acrylate or on methacrylate) and a catalyst for curing and setting the adhesive. These two components are stored in two different compartments and are mixed at the time of application of the adhesive. This catalyst is a free-radical polymerization initiator, in particular based on peroxide, and is well known in the art.

The compositions containing the curing agent also contain other elements, such as a cure accelerator, a rheology modifier or an adhesion promoter.

The cure accelerator serves to promote curing and hardening of the adhesive when the catalyst is added. The use of tertiary amines, preferably aromatic tertiary amines, such as dimethyl-para-toluidine (DMPT), and/or 2,2'-(p-tolylimino) diethanol or dimethylaniline (DMA), is known in the art.

These cure accelerators make it possible to obtain a high degree of curing of the adhesive and to improve its mechanical performance levels and its strength in a difficult environment.

Such tertiary amines are in particular described in U.S. Pat. No. 4,223,115 and EP 894 119.

SUMMARY OF THE INVENTION

However, these amines have certain disadvantages, in particular with regard to the curing parameters (gelation, exothermicity) which make them unsuitable for certain industrial applications.

In the context of the present invention, the inventors have substituted this category of tertiary amine with another category of high-molecular-weight tertiary amine which is less toxic, as described in WO 03/086327, which makes it possible to preserve the mechanical properties and the strength properties over time by virtue of a degree of curing which is just as high.

Thus, the amines used in the context of the invention are not toxic, can be used at a lower dosage than the prior art amines, and react completely with the free-radical polymerization initiator. Moreover, surprisingly, such amines improve the rapidity of gelation of adhesives, compared with the prior art amines. This makes it possible to use structural adhesives in new applications, as described hereinafter.

Document WO 98/34980 describes the use of amines as can be used in the context of the present invention, as a marker for curing owing to the change in color of the amine during the curing. The compositions described in this document thus also comprise a reducing agent for initiating curing by generating free radicals after interaction with an oxidizing agent.

Document JP 2007 169560 describes the use of amines as usable in the context of the present invention, for coloring during curing, a polymerization initiator being used, moreover.

Thus, the invention relates to a composition that can be used in a structural adhesive, said structural adhesive being formed from said composition and from a catalyst comprising a radical polymerization initiator of peroxide type, said composition comprising:
(a) at least one methacrylate ester monomer,
(b) a phosphate-ester-based adhesion promoter,
(c) a cure accelerator comprising a tertiary amine of formula I:

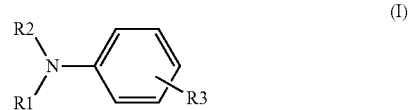

(I)

in which:
the R3 group is a resonance electron-donating group comprising at least one aromatic group which is capable of forming, with the radical:

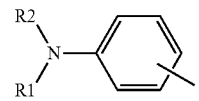

and in combination with said radical polymerization initiator, a conjugated system exhibiting an absorption in the visible field of the electromagnetic spectrum, so as to generate a coloration of said polymer or of said cement during the reaction for polymerizing said monomer,
the R1 and R2 groups are respectively and independently:
linear or branched $C_1$ to $C_{16}$, preferably $C_1$ to $C_5$, groups,
$C_5$ to $C_{30}$, preferably $C_5$ to $C_{10}$, aryl or arylalkyl groups,
$C_2$ to $C_{15}$, preferably $C_2$ to $C_5$, alkylidene groups.

DETAILED DESCRIPTION OF THE INVENTION

In one preferred embodiment, said R3 group comprises at least one tertiary amine linked to an aromatic group, which makes it possible in particular to improve the activation.

Thus, the composition according to the invention contains tertiary polyamines, the tertiary amine groups being borne by aromatic groups. This particular architecture makes it possible to color the adhesive during the curing phase.

In one preferred embodiment, the R3 group comprises at least two tertiary amines linked to two distinct aromatic groups, and is in particular of the form:

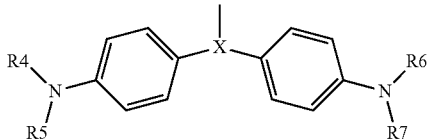

in which:
X is chosen from: CH and N, and
R4, R5, R6 and R7 are chosen from:
linear or branched $C_1$ to $C_{16}$, preferably $C_1$ to $C_5$, alkyl groups,
$C_5$ to $C_{30}$, preferably $C_5$ to $C_u$, aryl or arylalkyl groups,
$C_2$ to $C_{15}$, preferably $C_2$ to $C_5$, alkylidene groups.

Use is particularly preferably made, as cure accelerator in the context of the invention, of a polyamine corresponding to the formula:

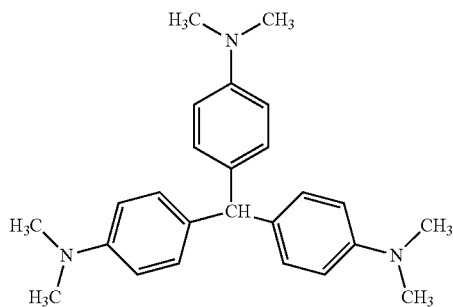

This tertiary triamine is 4,4',4"-methylidynetris(N,N-dimethylaniline). It is also referred to as "leuco crystal violet", "leuco" or "LCV". The symmetry of the molecule and the presence of three possible active sites for activating the radical polymerization initiator make this polyamine particularly preferred for the use of the invention.

Other amines corresponding to formula (I) are described in WO 03/086327. These high-molecular-weight polyamines can also be for producing a composition according to the invention. It is also possible to mix several polyamines in a composition according to the invention, or to add other cure activators, although, in one particular embodiment, the composition does not comprise any cure activators other than the amines of formula (I).

It is possible to use an activator of formula (I) which is a tertiary diamine of formula (I) in which the R3 group is of the form:

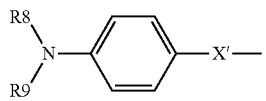

where
X' is chosen from: $CH_2$, O, O—$C_6H_4$—O, N—H and N—R, and
R8, R9 and R are respectively and independently:
linear or branched $C_1$ to $C_{16}$, preferably $C_1$ to $C_5$, alkyl groups,
$C_5$ to $C_{30}$, preferably $C_5$ to $C_{10}$, aryl or arylalkyl groups,
$C_2$ to $C_{15}$, preferably $C_2$ to $C_5$, alkylidene groups.

The activator of formula (I) may also be chosen such that R3 is of the form:

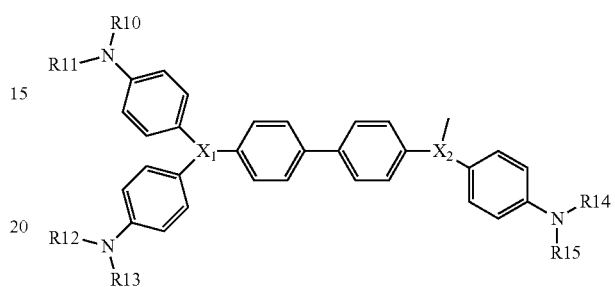

$X_1$ and $X_2$ being chosen from: N and CH,
R10 to R15 being independently:
linear or branched $C_1$ to $C_{16}$, preferably $C_1$ to $C_5$, alkyl groups,
$C_5$ to $C_{30}$, preferably $C_5$ to $C_{10}$, aryl or arylalkyl groups,
$C_2$ to $C_n$, preferably $C_2$ to $C_5$, alkylidene groups.

The cure accelerator is added in an amount of between 0.1% and 2% by weight in the composition, preferably between 0.2% and 1.5% by weight.

In the context of the composition according to the invention, the phosphate-ester-based adhesion promoter is preferably methacrylated. In particular, a phosphate-ester-based adhesion promoter which is the 2-hydroxyethyl methacrylate phosphate ester is used. It may in particular be obtained under the name Genorad 40 (Rahn A G, Zurich, Switzerland). Such adhesion promoters are well-known in the art, and are in particular described in U.S. Pat. No. 4,223,115. Mention may thus be made of 2-methacryloyloxyethyl phosphate, bis(2-methacryloyl-oxyethyl phosphate), 2-acryloyloxyethyl phosphate, bis(2-acryloyloxyethyl phosphate), methyl-(2-meth-acryloyloxyethyl phosphate), ethyl-(2-methacryloyl-oxyethyl phosphate), a mixture of 2-hydroxyethyl methacrylate monophosphate and diphosphate esters (in particular the product known under the name T-Mulz 1228 (Harcros Organics, Kansas City, US)) and related compounds or derivatives. Between 1% and 6% by weight of this adhesion promoter is added, preferably between 2% and 4%.

The combined use of an adhesion promoter and of a high-molecular-weight tertiary polyamine according to the invention in fact makes it possible to accelerate the gelation compared with the use of the same adhesion promoter and of a low-molecular-weight amine of the prior art.

In one preferred embodiment, the ester monomer (a) is a methacrylate monomer. A methacrylate monomer in which the alcohol part has a short linear chain (i.e. having one or two carbon atoms) is preferably chosen. Thus, the preferred monomers according to the invention are methyl methacrylate and ethyl methacrylate.

In another embodiment, the alcohol part has at least one ring, which may be substituted or unsubstituted. Thus, in this embodiment, the monomers can in particular be chosen from tetrahydrofurfuryl methacrylate, phenoxyethyl methacrylate, isobornyl methacrylate, glycidyl ether methacrylate, benzyl methacrylate, cyclohexyl methacrylate, trimethylcyclohexyl methacrylate and hydroxyethyl methacrylate.

Mixtures of these esters can also be used. The percentage by weight of methacrylate ester in the composition is preferably between 20% and 80%, more preferably between 30% and 65%, even more preferably from 39% to 58%, i.e. approximately in the region of 50%.

As mentioned above, the use of cure accelerators in the compositions according to the invention makes it possible to accelerate the gelation of the adhesives using such compositions, and to modify the exothermicity peak. It may, however, be advantageous to control this gelation, and to delay it. This can be carried out by adding, to a composition according to the invention, an amine (d) chosen from the group of substituted or unsubstituted anilines, toluidines and phenols. Preference is in particular given to para-toluidines of formula:

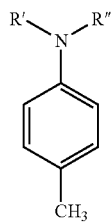

The R' and R" groups that can be used are in particular $C_1$ to $C_6$ alkyl groups, OH groups, $OC_nH_{2n-1}$ groups with n less than or equal to 4, $OOCCH_3$ groups or the like, or OR groups in which R is a $C_1$ to $C_6$ alkyl. Particularly suitable amines (d) are especially N,N-bis(2-hydroxyethyl)-p-toluidine, N-methyl-N-hydroxyethyl-p-toluidine or N,N-bis(2-hydroxyethyl)-3-methylaniline, or 2,4,6-tri(dimethylaminomethyl)phenol. The amount of these amines in the composition is between 0.5% and 3% by weight.

The composition may also contain a metallic acrylate or methacrylate monomer (e) (metallic salt (or comparable) of acrylic or methacrylic acid), which is in particular zinc-based. The presence of this compound in the composition makes it possible in particular to improve the mechanical performance levels of the adhesive, and also to adjust the gel and/or exothermicity times. As compound (e), use may in particular be made of zinc diacrylate, zinc dimethacrylate, zinc monomethacrylate, iron diacrylate, iron dimethacrylate, iron monomethacrylate, calcium diacrylate, calcium dimethacrylate, calcium monomethacrylate, magnesium diacrylate, magnesium dimethacrylate and magnesium monomethacrylate monomers. The amount of this salt in the composition is between 0.5% and 3% by weight.

It is preferable for the composition to also contain at least one elastomer (f). If required, it is functionalized (having a double bond at its ends, in particular methacrylate functions so as to improve the bonds with the monomers). In certain cases, a liquid elastomer is chosen. At least one functionalized elastomer, alone or as a mixture with at least one nonfunctionalized elastomer, is preferably used.

When the composition contains one or more elastomeric block copolymers (see below), the elastomer (f) is chosen such that it is compatible in solution with the block copolymers used. In particular, it is chosen in such a way that its Hildebrand solubility parameter is compatible with the Hildebrand solubility parameters of the block copolymers used. In particular, it is chosen in such a way that its value does not differ by more than 10% from the average of the values of the Hildebrand solubility parameters of the block copolymers used (for example, 8.3 $(cal \cdot cm^{-3})^{1/2}$ for the SIBS MD6455). The Hildebrand solubility parameter is well known and is calculated by the square root of the cohesive energy density of the compound. The Hildebrand solubility parameter is directly related to the dispersion forces (Van der Waals forces) which are exerted between the molecules of a chemical substance. In particular, the Hildebrand solubility parameter (expressed as $cal^{1/2}$ $cm^{-3/2}$) of the elastomer (h) is between 8 and 9 (between 16 and 19 when the solubility parameters are expressed as $MPa^{1/2}$). Thus it is preferred to use elastomers of the polybutadiene homopolymer type (the polybutadiene then being preferably chosen to be liquid and functionalized), or polyisoprene homopolymer type. Polychloroprene (Neoprene AD10, DuPont, USA) can also be used. Butadiene-acrylonitrile copolymer elastomers, which are in particular functionalized, can also be used. The functionalities are borne by the end chains and the functional groups that can be used are carboxyl (COOH), amine (NH or $NH_2$), vinyl methacrylate or epoxy groups.

It is thus possible to use a functionalized polybutadiene such as Hypro™ VTB 2000×168 (vinyl end groups), alone or as a blend with a polychloroprene or a nonfunctionalized polybutadiene such as Hypro™ CTB 2000×162 (carboxyl end groups) (Emerald Performance Materials (EPM), Cuyahoga Falls, Ohio, USA). It is also possible to use Hypro™ VTBNX or CTBNX (butadiene-acrylonitrile copolymers) having, respectively, carboxyl and vinyl functionalities, and more particularly Hypro™ VTBNX 1300×43 or 1300×33.

This elastomer (f) is preferably present in an amount of between 4% and 30% by weight in the composition according to the invention, preferably between 6% and 15%, more preferably between 8% and 12%. A smaller amount of elastomer is used when the composition contains one or more block copolymers (see below).

In one particular embodiment, the composition also contains an elastomeric block copolymer containing styrene and at least one second monomer (g). Said second monomer of the elastomeric block copolymer (g) is advantageously chosen from isoprene, butadiene and ethylene. In particular, the block copolymer (g) is chosen from a block copolymer containing styrene and isoprene, an elastomeric block copolymer containing styrene and butadiene or ethylene, and blends thereof.

The composition according to the invention may also contain a blend of various block copolymers. Thus, in another embodiment, it comprises a styrene-isoprene-styrene (SIS) block copolymer (g) and at least one block copolymer containing styrene and butadiene or ethylene (h).

When it contains butadiene, this block copolymer (h) can be a styrene-butadiene-styrene (SBS) or a styrene-isoprene-butadiene-styrene (SIBS) copolymer such as Kraton MD6455 (from the company Kraton Polymers) described by Dr Donn DuBois et al., at the Adhesives & Sealants Council Meeting, Louisville, Ky., 9-12 Oct. 2005.

When it contains ethylene, this block copolymer (h) can be a SEBS (styrene-ethylene/butylene-styrene copolymer) Or a SEPS (styrene-ethylene/propylene-styrene copolymer). These compounds are available in the Kraton G range (Kraton Polymers).

In the preferred embodiment of the invention, the block copolymer (h) contains butadiene.

Preferably, the styrene is present in a proportion of between 15% and 50%, more preferably between 22% and 40%, even more preferably approximately 28-33% by weight of the SBS copolymer. It is present in a proportion of between 12% and 24%, more preferably at approximately 18-19% by weight in the SIS or SIBS copolymers.

Preferably, the composition contains a blend of an SIS and of an SIBS in a proportion ranging from 4:1 (by weight in the composition) to 1.5:1. The preferred proportion of SIS relative to the SIBS is approximately 3:1 or 3.3:1. However, it is also possible to use a blend of SIS and of SBS in the same relative proportions as the SIS/SIBS blend. A blend of SIS, SIBS and SBS can also be used. Another block copolymer can also be added to one of these blends.

The SIS, SBS or SIBS block copolymers that can be used according to the invention are well known to those skilled in the art. They are in particular produced by the company Kraton Polymers (Houston, Tex., USA). Thus, the Kraton D1160 SIS described in US 20050238603 or Kraton K1161, the Kraton D1102 SBS described in U.S. Pat. No. 5,106,917 and the Kraton MD6455 or Kraton MD 6460 SIBS can be used.

Those skilled in the art know how to select the SIS, SIBS or SBS block copolymers that can be used in the composition according to the invention, from those which exist, according in particular to their ability to dissolve in the monomers used, or to their tensile mechanical strength.

Preferably, the composition according to the invention comprises between 5% and 30% by weight, preferably between 12% and 25%, and more preferably between 15% and 25%, of the elastomeric block copolymer(s).

In one particular embodiment, the composition according to the invention contains an elastomeric block copolymer containing styrene and isoprene and at least one elastomeric block copolymer containing styrene and butadiene, i.e. an SIS/SIBS blend, an SIS/SBS blend, or an SIS/SIBS/SBS blend.

In another embodiment, the composition according to the invention contains a single elastomeric block copolymer, containing styrene and isoprene, i.e. an SIS.

In another embodiment, the composition according to the invention contains a single elastomeric block copolymer, containing styrene and butadiene, chosen from an SIBS or an SBS.

If the composition contains one or more block copolymers, the relative proportions of the blend of block copolymers ((g) and/or (h)) and of the elastomer (f) are between 4:1 and 0.5:1 by weight in the composition, preferably approximately 2:1. However, it is also possible to have relative proportions of the order of approximately 0.5:1.

The composition according to the invention may also contain elastomeric polymeric particles (i). These particles are called "core-shell", are well known to those skilled in the art, and are formed from a "hard" thermoplastic shell, preferably based on poly(methyl methacrylate) (PMMA), and from an elastomeric core generally based on butadiene, often copolymerized with styrene, or acrylic-based. In the use of the invention, mention may especially be made of acrylonitrile-butadiene-styrene (ABS), methacrylate-butadiene-styrene (MBS), methacrylate-acrylonitrile-butadiene-styrene (MABS) and methacrylate-acrylonitrile polymers, and blends thereof.

These particles contain a crosslinked elastomeric core surrounded by a thermoplastic shell, which is often a methyl methacrylate polymer (PMMA). U.S. Pat. No. 3,985,703, U.S. Pat. No. 4,304,709, U.S. Pat. No. 6,433,091, EP 1256615 or U.S. Pat. No. 6,869,497 describe in particular such particles, which are thus well known to those skilled in the art.

In particular, impact-modifying particles are preferred, particularly MBS impact modifiers. In one preferred embodiment, these MBSs have a slight crosslinking of the polymer forming the core. In addition, these MBSs, in addition to their impact resistance, also preferably have a shock-induced crack resistance.

Core-shell polymers are available from many companies. Mention may thus be made of GE Plastics or Arkema (Paris, France). The preferred particles are in particular of the Clearstrength C301, C303H, C223, C350, C351, E920 or C859 type from Arkema, the C301 and C303H MBSs being preferred. It is also possible to use Durastrength D300 or D340 from Arkema, having an acrylic core surrounded by a PMMA shell. Likewise, it is also possible to use the MBSs developed by Rohm & Haas (Philadelphia, Pa., United States), in particular Paraloid™ BTA 753.

These particles (i) may be used by themselves or as a mixture. Thus, in one particular embodiment of the invention, a mixture of MBS particles (in particular C303H or C301) and of particles having a PMMA shell and an acrylonitrile core (in particular D340 particles) is used.

Preferably, these particles (i) are present in the composition in an amount of between 2% and 20% by weight of the composition, preferably between 5% and 15% by weight.

In one particular embodiment, the composition also contains at least one acrylic ester monomer (j) in which the alcohol part has a linear chain of at least 6 carbon atoms (a long-chain monomer). Thus, it is preferred to use lauryl methacrylate, 2-ethylhexyl methacrylate, 2-ethylhexyl acrylate, esters based on polyethylene glycol, or mixtures of these esters. It is preferable for the composition to contain at most 10%, more preferably at most 8%, or even at most 5% by weight in total of these long-chain acrylic monomers. In one particular embodiment, the composition comprises a mixture of two long-chain acrylic ester monomers. Preferably, when the composition contains only a single acrylic ester monomer (h), it is preferable for it to be present in an amount of less than or equal to 8% by weight, although it is acceptable for there to be an amount thereof of between 8% and 10% when the composition contains a mixture of these esters (j). In this case, it is preferred for each to be present at no more than 5%.

The composition may also contain other monomers such as acrylonitrile, methacrylonitrile or styrene.

The composition according to the invention may also contain an acid monomer such as an acid monomer that can be polymerized by free radicals, known in the art, of the unsaturated carboxylic acid, maleic acid, crotonic acid, isophthalic acid and fumaric acid type. It is also possible to add isobornyl acrylate (IBXA), 2-hydroxyethyl methacrylate (HEMA), 2-hydroxypropyl methacrylate (HPMA), 2-(perfluorooctyl)ethyl acrylate (POA), tetrahydrofurfuryl acrylate (THFA) or isobutoxy-methylacrylamide (IBMA). Mixtures of these compounds, in particular a mixture of HEMA and HPMA, may be added. Methacrylic acid or acrylic acid or HEMA is preferred. Between 2% and 10% of this compound, preferably between 3% and 7%, are added.

The composition according to the invention may also contain, in its preferred embodiments, at least one additional compound such as a rheology modifier. The rheology modifier serves to provide good viscosity of the composition according to the invention, so that it can be easily applied to the surfaces to be bonded. Polyamides such as Disparlon 6500 (Kusumoto Chemicals Ltd, Japan) or pulverulent elements based on silica or the like (untreated fumed silica or pyrogenic silica) may be used.

The composition may also contain metal ions, and also other compounds such as saccharin (a sweetener authorized in Europe under number E-954, also called 1,1-dioxo-1,2- benzothiazol-3-one) or its derivatives (see WO 87/000536), and/or 1'1-acetyl-2-phenylhydrazine (between 0.1% and 5% by weight).

Other components such as mineral fillers ($TiO_2$, $CaCo_3$, $Al_2O_3$, zinc phosphate), ultraviolet stabilizers (such as 2-hydroxyphenyltriazine, Tinuvin 400 from Ciba-Geigy) and wax may also be added to the composition according to the invention. Free-radical polymerization inhibitors such as BHT, or benzoquinones such as naphthoquinone, hydroquinone or ethylhydroquinone may also be added in order to increase the lifetime of the composition.

In another embodiment, the invention relates to a composition comprising a methacrylate ester monomer, a cure accelerator/initiator comprising a tertiary amine of formula (I) as defined above, and saccharin (or a saccharin derivative). In this embodiment, it may be advantageous for this composition to contain an acid monomer, in particular HEMA. In this embodiment, the presence of the adhesion promoter (b) is preferred, but is not obligatory. In this embodiment, the composition may also contain the components (d) to (j) as described above, and also the other components mentioned above.

As mentioned above, the structural adhesives are formed from two components which are a composition according to the invention and a catalyst for curing and setting the adhesive. These two components are stored in two different compartments and are mixed at the time of application of the adhesive.

As mentioned, a catalyst which is a free-radical polymerization initiator, and which is in particular peroxide-based, is chosen. Such catalysts are well known in the art. Benzoyl peroxide, tert-butylperoxybenzoate and cumene hydroperoxide may in particular be chosen. It is preferred when the catalyst contains between 5% and 40% by weight of peroxide, in particular approximately 20% by weight of peroxide. A paste containing approximately 20% of benzoyl peroxide is in particular used. This catalyst is in particular contained in a plasticizer such as diisobutyl phthalate or benzyl phthalate.

The catalyst is used in a ratio of from 1:1 to 1:30 (by volume), preferably from 1:5 to 1:30, even more preferably approximately 1:10, relative to the second component, which is the composition according to the invention.

The invention thus relates to the combined use of a composition according to the invention and of a catalyst comprising a free-radical polymerization initiator of peroxide type in a method for adhesively bonding one material to a second material, and in particular when at least one of the materials is metallic.

The use of a composition according to the invention and of a catalyst therefore makes it possible to bond metals, plastics and composites to a composite and thus can be applied in particular in the field of silo, boat or truck trailer construction. It can also be used in the automotive construction field or the railroad field.

Thus, the composition enables a material to be adhesively bonded to another material, one or the other material being in particular a metal, a plastic, wood or a composite. The composition may therefore be used in one or other of the following applications: metal/metal, metal/composite, metal/plastic, metal/wood, wood/plastic, wood/composite, wood/wood, plastic/composite, plastic/plastic or composite/composite adhesion.

The composition according to the invention is also particularly advantageous when a material has to be bonded to a composite or a metal.

The flexible methacrylate structural adhesives having high mechanical performance obtained with the composition according to the invention are resilient and resistant to shocks and vibrations. They make it possible to produce adhesive joints between materials of the same or different chemical nature, for example: concrete, wood, ceramics, glass, ferrites, aluminum, anodized aluminum, steel, galvanized steel, stainless steel, painted metals, steel, copper, zinc, ABS, PVC, polyester, acrylics, polystyrene, gel-coat polyester or epoxides, composites, glass-fiber-reinforced composites, laminates, honeycomb structures and any painted or lacquered material. The structural adhesives obtained with the composition according to the invention are particularly advantageous for bonding galvanized steel or electrogalvanized steel.

They can also fill large gaps between substrates of different and variable thickness, roughness or flatness, with better stress distribution.

The flexibility of this composition thus makes it possible to take up the forces of differential dilations between the substrates over long lengths of several meters, reducing and eliminating the geometrical faults (angle, roughness, flatness).

The applications and activity sectors involved comprise in particular:

Bonding of reinforcements, rails, frame structures, beams, stiffeners, panels, partitions, fasteners, supports, body components, reinforcing brackets, inserts, cylindrical and conical components, hinges, frames, etc.; bonding with lamination take-up on partitions, bonding with filling requiring high mechanical strength;

In particular bonding of any bonded structural or mechanical component from the following fields of construction: shipbuilding, automotive, railroad (and infrastructure), aeronautical, aerospace, electronic, electromechanical and domestic electrical equipment, military structures, shop signs, traffic (and advertising) signs, urban furniture, exterior joinery (windows, picture windows, French doors, entry doors and garage doors), wind machines, containers, engineering structures and infrastructures (in particular suspension bridges, offshore oil platforms and aircraft hangers), construction and fastening, curtain walling and solar panels.

When the adhesive produced with a composition according to the invention exhibits a rapid gelation, this makes it possible to solve the following problems:
  magnet bonding in the manufacture of loudspeakers: rapid progression to gel time on the assembly line in fact makes it possible to immobilize or fix the parts rapidly without them having the time to slide on one another with a high production rate enabling a bonding procedure to be carried out every 2 minutes instead of every 4 minutes.
  Magnet bonding (manufacture of windshield-wiper motors, small motors), assembly of electronic components.
  Bonding of rearview mirror inserts on a windshield: metal and plastic on laminated glass (for the repair, the operator does not have to hold the insert on the glass for more than one to two minutes).
  Bonding of inserts vertically on supports made of metals and composites: stainless steel male insert on a square plate 32×32 mm onto which a tapped bushing is welded: it involves a male insert with a perforated plate 38 mm in diameter, onto which an M6 threaded stud 25 mm in length is welded (see in particular the Bighead® inserts (Bighead Bonding Fastener, Bournemouth, GB)). Rapid bonding with a gel time is necessary in order to avoid the perforated insert sliding on the vertical support. The adhesive rapidly plays its role of rivet in the perforations of the insert.

Rapid positioning on high production rate assembly lines and on many materials.

Positioning and bonding of packing pieces.

Rapid assembly on an assembly line with gaps that may be large, up to 5 mm, and on a multitude of materials: aluminum, steel, galvanized steel, stainless steel, electrogalvanized steel, bronze, lacquered steel, thermoplastics, glass, and composites.

Bonding on wood and plywood, making it possible to prevent the wood absorbing the monomers too rapidly.

EXAMPLES

The examples below illustrate the invention without restricting the scope thereof.

Example 1

Raw Materials Used and Methodology

The following components were used:
Composition
methacrylate ester monomer (a): methyl methacrylate (MMA)/isobornyl methacrylate/hydroxyethyl methacrylate
functionalized liquid elastomer (f): HYPRO™ VTB 2000×168 (EPM, USA)
acid monomer: methacrylic acid (MAA)
adhesion promoter (b): phosphate methacrylate Genorad 40 (Rahn AG)
cure accelerator (c): 4,4',4"-methylidyne-tris(N,N-dimethylaniline) (LCV)
cure accelerator (control): N,N-dimethylaniline (DMA), or dimethyl-para-toluidine (DMPT)
toluidine (d): N,N-bis(2-hydroxyethyl)-p-toluidine (PTE)
zinc dimethacrylate (e): SR 708 (Sartomer)
fillers: metal ions, rheology modifiers, pulverulents
SIS copolymer (g): Kraton D1160 (Kraton Polymers)
SIBS copolymer (h): Kraton MD6455 (Kraton Polymers)
rheology modifier: Disparlon 6500 (Kusumoto Chemicals)
elastomeric polymeric particles (i): Clearstrength C303H (Arkema).
Catalyst
benzoyl peroxide at 20%.
Ratio of composition:catalyst mixture=10:1.

The tensile shear strength (SS) was measured according to the ISO 4587 standard. Briefly, 2024T3 aluminum test pieces measuring 100×25×1.6 mm (L×W×T) were used. Two test pieces were bonded to each other, the overlap area being 25×12 mm (300 mm²), with an adhesive joint thickness of approximately 200 to 400 µm. The force needed to break the adhesive joint was then measured by pulling on the two test pieces.

In order to be industrially useable, it is preferable for it to be possible to handle the adhesive for several minutes (which corresponds to the gel time) and for the adhesive to cure rapidly after gelation. It is preferable for the maximum exothermicity time to be close to the gel time so that the user can rapidly handle his or her parts.

The gel time and the maximum exothermicity peak were also measured.

Example 2

Use of a High-Molecular-Weight Polyamine

The following compositions were analyzed:

| Components | A1 | A2 | A3 | A4 | A5 |
|---|---|---|---|---|---|
| Methyl methacrylate | 28.5 | 28.5 | 28.5 | 27.0 | 29.0 |
| VTB 2000×168 | 28.0 | 28.0 | 28.0 | 28.0 | 28.0 |
| Isobornyl methacrylate | 5.5 | 5.5 | 5.5 | 5.5 | 5.5 |
| Hydroxy-ethyl methacrylate | 6.0 | 6.0 | 6.0 | 6.0 | 6.0 |
| Methacrylic acid | 4.0 | 4.0 | 4.0 | 4.0 | 4.0 |
| Genorad 40 | 3.0 | 3.0 | 3.0 | 3.0 | 3.0 |
| SR 708 | — | — | — | 1.5 | — |
| DMA | 1.0 | — | — | — | — |
| DMPT | — | 1.0 | — | — | — |
| PTE | — | — | — | — | — |
| LCV | — | — | 1.0 | 1.0 | 0.5 |
| Fillers | 24.0 | 24.0 | 24.0 | 24.0 | 24.0 |
| Gel time (on 20 gr) | 9 min 25 s | 4 min 10 s | 54 s | 54 s | 2 min 33 s |
| Maximum exo-thermicity | 15 min 40 s 108° C. | 7 min 36 s 116° C. | 8 min 28 s 119° C. | 2 min 36 s 109.5° C. | 71 min 48 s 89° C. |
| Shear strength | 16.7 MPa | 15.7 MPa | 15.3 MPa | 17.9 MPa | 15.8 MPa |
| Fracture surfaces | 100% cohesive | 100% cohesive | 100% cohesive | 100% cohesive | 100% cohesive |

Formulation A1: uses an amine as described in the prior art (control).

Formulation A2: uses an amine as described in the prior art (control).

Formulation A3: the gel time is very rapid, the exothermicity peak being more distant.

Formulation A4: use of SR 708 from Sartomer in combination with LVC: this metallic dimethacrylate monomer accelerates the curing rate (exothermicity time) and improves mechanical performance.

These results therefore show that the use of a high-molecular-weight polyamine makes it possible to accelerate the gelation, while at the same time maintaining an exothermicity peak distant from this gelation. The addition of various components to the mixture makes it possible to control the gelation and the exothermicity peak, while maintaining or improving mechanical performance.

Example 3

Bonding of Hot-Dipped Galvanized Steel to Itself

Measurement of the shear strength according to the protocol of the ISO 4587 standard (galvanized steel test pieces).

| Components | B1 | B2 | B3 | B4 | B5 |
|---|---|---|---|---|---|
| Methyl methacrylate | 28.1 | 27.4 | 25.4 | 26.25 | 28.25 |
| 1,4-Naphtho-quinone | 0.003 | 0.003 | 0.003 | 0.003 | 0.003 |
| VTB 2000×168 | 28.0 | 28.0 | 28.0 | 28.0 | 28.0 |
| Isobornyl methacrylate | 5.5 | 5.5 | 5.5 | 5.5 | 5.5 |

-continued

| Components | B1 | B2 | B3 | B4 | B5 |
|---|---|---|---|---|---|
| Hydroxyethyl methacrylate | 6.0 | 6.0 | 6.0 | 6.0 | 6.0 |
| Methacrylic acid | 4.0 | 4.0 | 4.0 | 4.0 | 4.0 |
| Genorad 40 | 3.0 | 3.0 | 3.0 | 3.0 | 3.0 |
| Saccharin | — | — | 2.0 | 2.0 | — |
| DMA | — | 0.9 | 0.9 | — | — |
| PTE | 1.4 | 1.2 | 1.2 | 1.2 | 1.2 |
| LCV | 0.5 | — | — | 0.05 | 0.05 |
| Fillers | 23.5 | 24.0 | 24.0 | 24.0 | 24.0 |
| Shear strength | 15.7 MPa | 1.1 MPa | 9.3 MPa | 8.2 MPa | 1.5 MPa |
| Fracture surfaces | 100% cohesive | 100% adhesive | 100% adhesive | 100% adhesive | 100% adhesive |

NB: The shear strength of formulation B1 was performed on aluminum.
For B1, gel time (on 20 gr): 11 min 52 s.
Maximum exothermicity: 14 min 36 s, 104° C. The gelation time is thus delayed and is close to the maximum exothermicity time. This adhesive is particularly suitable for uses in the field of bonding large parts.

Example 4

Bonding of Electrogalvanized Steel to Itself

Measurement of the shear strength according to the protocol of the ISO 4587 standard (electrogalvanized steel test pieces).

| Components | C1 | C2 | C3 | C4 | C5 |
|---|---|---|---|---|---|
| Methyl methacrylate | 49.997 | 49.997 | 47.997 | 47.997 | 48.797 |
| 1,4-Naphthoquinone | 0.003 | 0.003 | 0.003 | 0.003 | 0.003 |
| Kraton D1160 | 16.0 | 16.0 | 16.0 | 16.0 | 16.0 |
| Kraton MD6455 | 5.0 | 5.0 | 5.0 | 5.0 | 5.0 |
| VTB 2000x168 | 7.0 | 7.0 | 7.0 | 7.0 | 7.0 |
| A2EH | 4.0 | 4.0 | 4.0 | 4.0 | 4.0 |
| HEMA | 4.0 | 4.0 | 4.0 | 4.0 | 4.0 |
| Genorad 40 | 2.0 | 2.0 | 2.0 | 2.0 | 2.0 |
| Methacrylic acid | 4.0 | 4.0 | 4.0 | 4.0 | 4.0 |
| Saccharin | — | — | 2.0 | 2.0 | 2.0 |
| DMPT | 0.9 | — | — | 0.9 | — |
| DMA | — | 0.9 | 0.9 | — | — |
| LCV | — | — | — | — | 0.1 |
| PTE | 0.6 | 0.6 | 0.6 | 0.6 | 0.6 |
| ClearStrength 303H | 4.0 | 4.0 | 4.0 | 4.0 | 4.0 |
| Disparlon 6500 | 2.5 | 2.5 | 2.5 | 2.5 | 2.5 |
| Shear strength | 1.3 MPa | 2.7 MPa | 19.1 MPa | 5.2 MPa | 18.3 MPa |
| Fracture surfaces | 100% adhesive | 100% adhesive | 100% cohesive | 100% adhesive | 100% cohesive |

The invention claimed is:

1. A composition that can be used in a structural adhesive, said structural adhesive being formed from said composition and from a catalyst comprising a radical polymerization initiator of peroxide type, said composition comprising:
   (a) at least one methacrylate ester monomer,
   (b) a phosphate-ester-based adhesion promoter,
   (c) a cure accelerator comprising a tertiary amine of formula I:

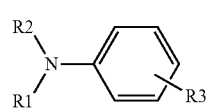

(I)

in which:
   the R3 group is a resonance electron-donating group comprising at least one aromatic group which is capable of forming, with the radical:

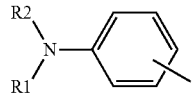

and in combination with said radical polymerization initiator, a conjugated system exhibiting an absorption in the visible field of the electromagnetic spectrum, for generating coloration of said polymer during the reaction for polymerization of said monomer,
   the R1 and R2 groups are respectively and independently:
      linear or branched C1 to C16 alkyl groups,
      C5 to C30 aryl or arylalkyl groups,
      C2 to C15 alkylidene groups,
   wherein said composition further comprises a metallic acrylate monomer (e) and a mixture of 2-hydroxyethyl methacrylate (HEMA) and 2-hydroxypropyl methacrylate (HPMA).

2. The composition of claim 1, further comprising an acid monomer that can be polymerized by free radicals.

3. The composition of claim 2, characterized in that said acid monomer that can be polymerized by free radicals is selected from the group consisting of maleic acid, crotonic acid, isophthalic acid, fumaric acid, methacrylic acid and acrylic acid.

4. The composition of claim 1, wherein said R3 group comprises at least one tertiary amine linked to an aromatic group.

5. The composition of claim 1, wherein the R3 group is a group of the form:

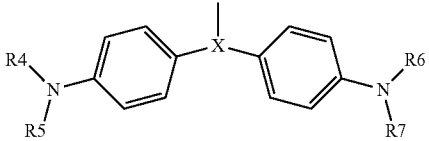

in which:
   X is selected from the group consisting of CH and N, and
   R4, R5, R6 and R7 are selected from the group consisting of
      linear or branched C1 to C16 alkyl groups,
      C5 to C30 aryl or arylalkyl groups,
      C2 to C15 alkylidene groups.

6. The composition of claim 1, wherein said cure accelerator corresponds to the formula:

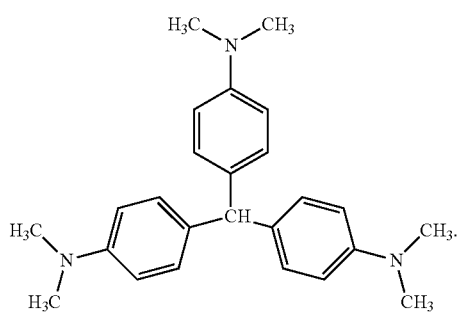 [SMILES: CN(C)c1ccc(C(c2ccc(N(C)C)cc2)c2ccc(N(C)C)cc2)cc1]

7. The composition of claim 1, wherein said phosphate-ester-based adhesion promoter is methacrylated.

8. The composition of claim 1, wherein said phosphate-ester-based adhesion promoter is the 2-hydroxyethyl methacrylate phosphate ester or a mixture of 2-hydroxyethyl methacrylate monophosphate and diphosphate esters.

9. The composition of claim 1, further comprising an amine (d) selected from the group consisting of substituted or unsubstituted toluidines, anilines and phenols.

10. The composition of claim 1, wherein said metallic acrylate monomer (e) is selected from the group consisting of zinc diacrylate, zinc dimethacrylate, zinc monomethacrylate, iron diacrylate, iron dimeth-acrylate, iron monomethacrylate, calcium diacrylate, calcium dimethacrylate, calcium mono-methacrylate, magnesium diacrylate, magnesium dimethacrylate and magnesium monomethacrylate monomers.

11. The composition of claim 1, further comprising at least one elastomer (f).

12. The composition of claim 11, wherein said at least one elastomer (f) is selected from the group consisting of functionalized or nonfunctionalized polybutadiene, polyisoprene, polychloroprene and blends of these components.

13. The composition of claim 1, further comprising an elastomeric block copolymer (g) containing styrene and at least one second monomer, selected from the group consisting of isoprene, butadiene and ethylene.

14. The composition of claim 13, wherein said elastomeric block copolymer (g) is a styrene-isoprene-styrene (SIS) copolymer, and further comprising at least one elastomeric block copolymer (h) containing styrene and another monomer selected from the group consisting of butadiene and ethylene.

15. The composition of claim 1, further comprising particles (i) formed from a thermoplastic shell and from an elastomeric core.

16. The composition of claim 15, wherein said particles (i) are selected from the group consisting of acrylonitrile-butadiene-styrene, methacrylate-butadiene-styrene, methacrylate-acrylonitrile-butadiene-styrene and methacrylate-acrylonitrile particles, and mixtures thereof.

17. The composition of claim 1, wherein said methacrylate ester monomer (a) is selected from the group consisting of methyl methacrylate and ethyl methacrylate.

18. A method for adhesively bonding one material to a second material comprising the step of using the composition of claim 1 and a catalyst comprising a radical polymerization initiator of peroxide type to bond one material to a second material.

19. The method of claim 18, wherein at least one material is metallic.

* * * * *